US010773548B2

(12) United States Patent
Hubert et al.

(10) Patent No.: US 10,773,548 B2
(45) Date of Patent: Sep. 15, 2020

(54) WHEEL HUB ASSEMBLY HAVING DUAL ANGULAR POSITION SENSORS

(71) Applicant: Aktiebolaget SKF, Gothenburg (SE)

(72) Inventors: Mathieu Hubert, Ann Arbor, MI (US); Lokesh Nagarajan, Northville, MI (US); David Christopher Rybski, White Lake, MI (US)

(73) Assignee: Aktiebolaget SKF, Gothenburg (SE)

(*) Notice: Subject to any disclaimer, the term of this patent is extended or adjusted under 35 U.S.C. 154(b) by 70 days.

(21) Appl. No.: 16/156,039

(22) Filed: Oct. 10, 2018

(65) Prior Publication Data

US 2019/0126676 A1 May 2, 2019

Related U.S. Application Data

(60) Provisional application No. 62/570,362, filed on Oct. 10, 2017.

(51) Int. Cl.
*B60B 27/00* (2006.01)
*G01P 3/46* (2006.01)
(Continued)

(52) U.S. Cl.
CPC ...... *B60B 27/0068* (2013.01); *B60B 27/0005* (2013.01); *B60B 27/02* (2013.01); *B60T 8/171* (2013.01); *B60T 8/176* (2013.01); *B60T 8/329* (2013.01); *G01D 5/145* (2013.01); *G01D 5/36* (2013.01); *G01P 3/46* (2013.01); *G01P 3/487* (2013.01); *G01P 3/488* (2013.01); *B60B 2380/12* (2013.01); *B60B 2900/50* (2013.01); *B60T 2240/00* (2013.01);
(Continued)

(58) Field of Classification Search
CPC ... B60B 27/0068; B60B 27/005; B60B 27/02; B60B 2380/12; B60B 2900/50; B60T 8/171; B60T 8/176; B60T 8/329; B60T 2240/00; B60T 2270/10; B60T 2270/416; G01D 5/145; G01D 5/36; G01D 5/24466; G01P 3/46; G01P 3/488
See application file for complete search history.

(56) References Cited

U.S. PATENT DOCUMENTS

7,164,265 B2 * 1/2007 Giai ..................... B60B 27/00
324/174
7,228,932 B2 * 6/2007 Rosenthal ............ B60K 28/10
180/271
(Continued)

*Primary Examiner* — Thomas W Irvin
(74) *Attorney, Agent, or Firm* — J-Tek Law PLLC; Scott T. Wakeman; Mark A. Ussai (57) ABSTRACT

A vehicle wheel hub assembly includes an outer member configured to be mounted to a non-rotatable portion of the vehicle and an inner member rotatably supported in the outer member by a bearing and configured to support a vehicle wheel. A first target member is coupled with the inner member, and a first sensor is fixed to the outer member and positioned to sense an angular displacement of the first target member relative to the outer member and to produce a first output signal. A second target member is coupled with the inner member and is spaced axially from the first target member, and a second sensor is fixed to the outer member and positioned to sense an angular displacement of the second target member relative to the outer member and to produce a second output signal.

19 Claims, 5 Drawing Sheets

(51) Int. Cl.
  *G01D 5/14*    (2006.01)
  *G01D 5/36*    (2006.01)
  *B60T 8/32*    (2006.01)
  *B60B 27/02*   (2006.01)
  *B60T 8/176*   (2006.01)
  *B60T 8/171*   (2006.01)
  *G01P 3/487*   (2006.01)
  *G01P 3/488*   (2006.01)
  *G01D 5/244*   (2006.01)

(52) U.S. Cl.
  CPC ..... *B60T 2270/10* (2013.01); *B60T 2270/416* (2013.01); *G01D 5/24466* (2013.01)

(56) References Cited

U.S. PATENT DOCUMENTS

| | | | | |
|---|---|---|---|---|
| 7,265,537 | B2* | 9/2007 | Lutaud | G01D 5/34738 |
| | | | | 324/174 |
| 7,553,087 | B2* | 6/2009 | Iwamoto | F16C 19/522 |
| | | | | 324/207.22 |
| 7,733,083 | B2* | 6/2010 | Ozaki | B60B 27/0005 |
| | | | | 324/173 |
| 8,002,475 | B2* | 8/2011 | Serafini | F16C 41/007 |
| | | | | 384/448 |
| 8,950,339 | B2* | 2/2015 | Turmeau | B61F 5/28 |
| | | | | 105/218.1 |
| 2012/0105055 | A1* | 5/2012 | Takahashi | F16C 41/007 |
| | | | | 324/207.25 |
| 2019/0126677 | A1* | 5/2019 | Hubert | B60B 27/0068 |
| 2019/0322132 | A1* | 10/2019 | Bertola | F16C 33/723 |

* cited by examiner

WHEEL HUB ASSEMBLY HAVING DUAL ANGULAR POSITION SENSORS

CROSS-REFERENCE TO RELATED APPLICATIONS

The present application claims the benefit of U.S. Provisional Patent Application No. 62/570,362 filed on Oct. 10, 2017, the entire contents of which are hereby incorporated by reference.

TECHNOLOGICAL FIELD

The present disclosure is directed to a wheel hub assembly having improved wheel speed sensors and to an antilock braking system (ABS) including the wheel hub assembly, and, more specifically, to a wheel hub assembly having first and second wheel speed sensors configured to provide independent wheel speed signals and to an ABS system including the wheel hub assembly.

BACKGROUND

Wheel hub assemblies having wheel speed sensors are known. A conventional wheel hub assembly includes a fixed member and a rotatable member and a bearing that supports the rotatable member for rotation relative to the fixed member. In these assemblies, a sensor is mounted on the fixed member, and a target is mounted on the rotatable member. The target may comprise, for example, a plurality of circumferentially spaced magnetic poles, and the sensor may detect the movement of the magnetic poles past the sensor and produce an output signal each time a pole is sensed. The number of magnetic poles that are detected passing the sensor in a given time period can then be used to determine the speed of the wheel.

Signals from wheel speed sensors can be used for different purposes including for controlling a speedometer. These signals are also used for controlling antilock braking systems (ABS) and other traction and/or stability control systems which require accurate information about the speed of each vehicle wheel in order to control braking and/or power provided to each wheel. For example, during a braking operation, the ABS compares the signals from the wheel speed sensors of each vehicle wheel. If the ABS microprocessor sees the wheels are locked or turning at different speeds (skidding), it modulates the brakes in an effort to keep the all wheels rotating at the same rate. However, when a sensor produces an inaccurate signal, indicating for example, that one wheel is turning slower than the others, the ABS may release the brakes to that wheel even though braking is required. Similarly, erroneous sensor signals may prevent an ABS system from releasing braking when it is actually required. By keeping the wheels "unlocked" and then decelerating progressively, the braking distance is reduced.

Various environmental factors can damage the sensors and/or targets and lead to false readings. For example, even though the region around the sensors and targets is substantially sealed, road salt and/or excessive dirt or mud still may come between the sensor and the target and prevent the sensor from generating accurate readings. It would therefore be desirable to provide a wheel hub assembly that is capable of providing accurate information about the speed of each vehicle wheel even if a particular sensor and/or target is fouled or damaged.

SUMMARY

This problem and others are addressed by embodiments of the present disclosure, a first aspect of which comprises a vehicle wheel hub assembly that includes an outer member configured to be mounted to a non-rotatable portion of the vehicle and having an axial inner end and an axial outer end and an inner member rotatably supported in the outer member by a bearing. The inner member is configured to support a vehicle wheel for rotation about a central axis of the bearing, and the inner member comprises a shaft portion having an axially inner end and an axially outer end and a flange extending radially outwardly from the axially outer end of the shaft portion. A first target member is coupled with the inner member so as to be rotatable about the central axis, and a first sensor is fixed to the outer member and positioned to sense an angular displacement of the first target member relative to the outer member and to produce a first output signal. A second target member is coupled with the inner member so as to be rotatable about the central axis, and the second target member is spaced axially from the first target member. A second sensor is fixed to the outer member and positioned to sense an angular displacement of the second target member relative to the outer member and to produce a second output signal.

Another aspect of the disclosure comprises an antilock braking system (ABS) that includes the vehicle wheel hub assembly described above. The ABS also includes a controller in communication with the first sensor and the second sensor that is configured to receive the first output signal and the second output signal and control a brake member for braking the inner member relative to the outer member based on the first output signal and/or the second output signal. The controller is also configured to generate a first speed signal indicative of a vehicle speed from the first and second output signal and to generate an error signal when the first speed signal differs from the second speed signal by more than a predetermined amount.

A further aspect of the present disclosure comprises a method that includes using a first sensor rotationally fixed relative to a vehicle to obtain a first angular displacement signal from a first target mounted for rotation with a wheel of the vehicle and using a second sensor rotationally fixed relative to the vehicle to obtain a second angular displacement signal from a second target mounted for rotation with the wheel, the second target being axially spaced from first target.

BRIEF DESCRIPTION OF THE DRAWINGS

The foregoing summary, as well as the detailed description of the preferred embodiments of the present invention, will be better understood when read in conjunction with the appended drawings in which.

DETAILED DESCRIPTION

Figure 1:
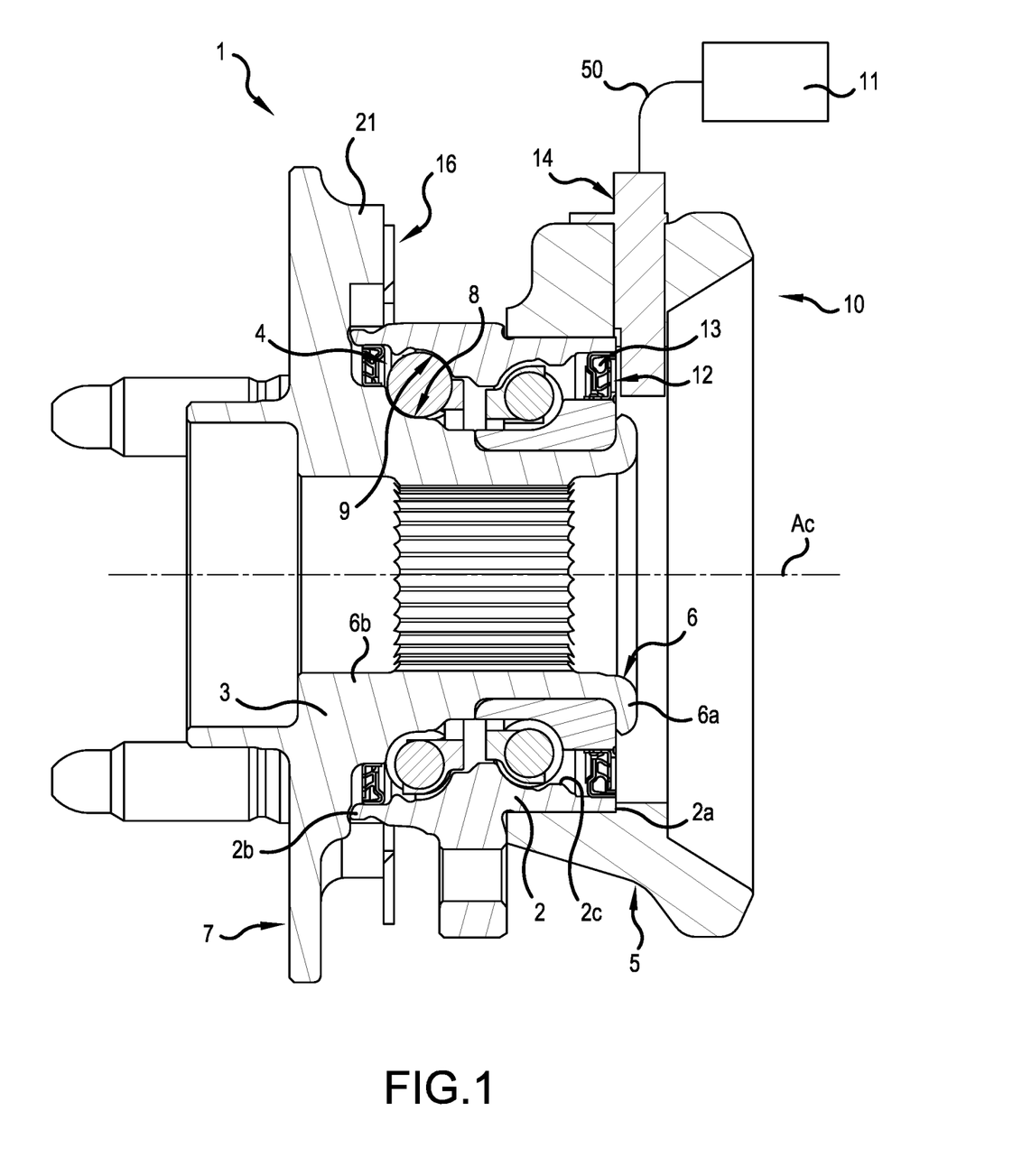
FIG. 1 is an axial cross-sectional view through a first portion of a wheel hub assembly according to the present disclosure showing a first sensor and a first sensor target member of a sensor assembly.
Figure 2:
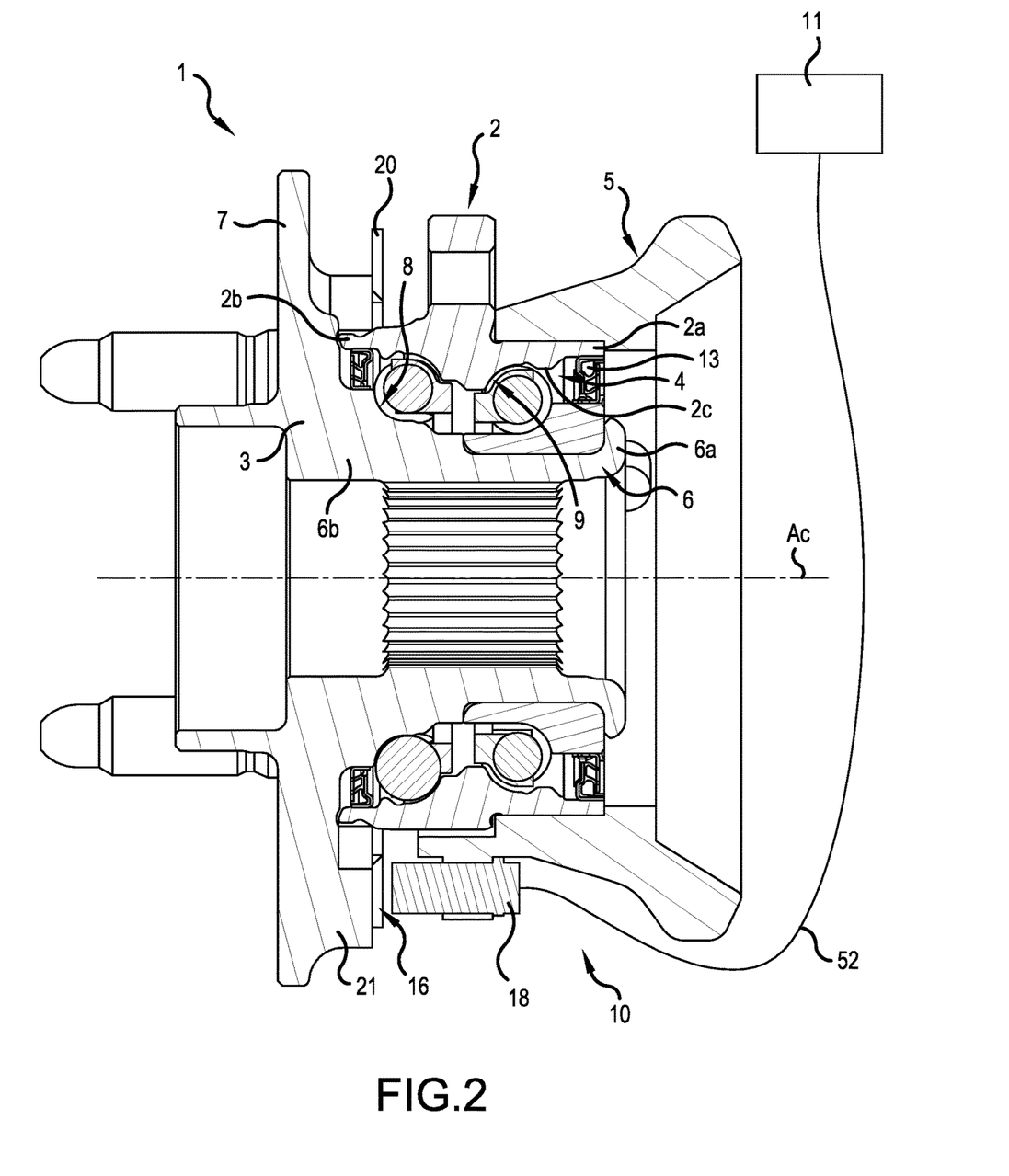
FIG. 2 is an axial cross-sectional view through a second portion of the wheel hub assembly of the present disclosure showing a second sensor target member and a second sensor of the sensor assembly.

Referring to the drawings, wherein the showings are for purposes of illustrating embodiments of the present invention only and not for the purpose of limiting same, FIGS. 1 and 2 show a vehicle wheel hub 1 that includes an outer member 2, an inner member 3 and a bearing 4 that supports the inner member 3 for rotation relative to the outer member 2. The outer member 2 is connectable with a non-rotatable portion 5 of the vehicle, which may be, for example, a steering knuckle, and the outer member 2 has an axially inner end 2a and an axially outer end 2b. The inner member 3 is connectable with a wheel (not illustrated) so as to be rotatable about a central axis AC and has a shaft portion 6 with an inner axial end 6a and an outer axial end 6b, and a flange 7 that extends radially outwardly from the outer end 6b of the shaft portion 6. The bearing 4 includes at least one inner race 8 formed on or disposed about the shaft portion 6 of the inner member 3 and at least one outer race 9 disposed around the inner race 8.

A sensor assembly 10 includes a first target member 12 (FIG. 1) coupled with the inner member 3 so as to be rotatable about the central axis AC and a first sensor 14 located proximal to the first target member 12 and configured to sense angular displacement of the first target member 12 so as to sense wheel rotation. Preferably, the first target member 12 is either mounted on or comprises an element of bearing seal assembly 13, for example, an L-shaped bracket that either supports an elastomeric seal lip or forms a slide surface for such a lip. A second target member 16 (FIG. 2) is mounted to the inner hub member 3 at a location that is axially spaced from the first target member 12 so that it is also rotatable with the inner member 3 around the central axis Ac. The second target member 16 is separate from and does not touch the first target member 12. A second sensor 18 is located proximal to the second target member 16 and is configured to sense angular displacement of the second target member 18 so as to sense wheel rotation.

The first and second sensors 14, 18 are in communication with a controller 11, which may comprise the control system for the vehicle or for an antilock brake system (ABS) and/or traction control system or other system in which wheel speed or total wheel revolutions are monitored, and to this end, the controller 11 may include or comprise a microprocessor, a microcontroller, an application-specific integrated circuit (ASIC), an integrated circuit (IC), a computer, a system-on-a-chip (SOC), a programmable logic element, or a field programmable gate array (FGPA) including a microprocessor.

Preferably, the first target member 12 is located proximal to the inner axial end 6a of the shaft portion 6 of the inner member 3, and is most preferably disposed about a section of the bearing inner race 8 between the inner race 8 and the outer race 9. The second target member 16 is located proximal to the outer axial end 6b of the inner member shaft portion 6 and extends radially outwardly from the shaft portion 6. In this embodiment, the second target member 16 is a attached to the flange portion 7 of the inner member 3 by a plurality of protrusions 21 that extend axially from the flange portion 7 such that the second target member 16 lies in a plane spaced from the main portion of the flange portion 7. Thus the first target member 12 and the second target member 16 are preferably located on radially opposite sides of the outer member 2 and at axially opposite sides of the shaft portion 6. In addition, each one of the first and second sensors 14, 18 is coupled with the outer member 2 or the non-rotatable portion 5 of the vehicle.

Figure 5:
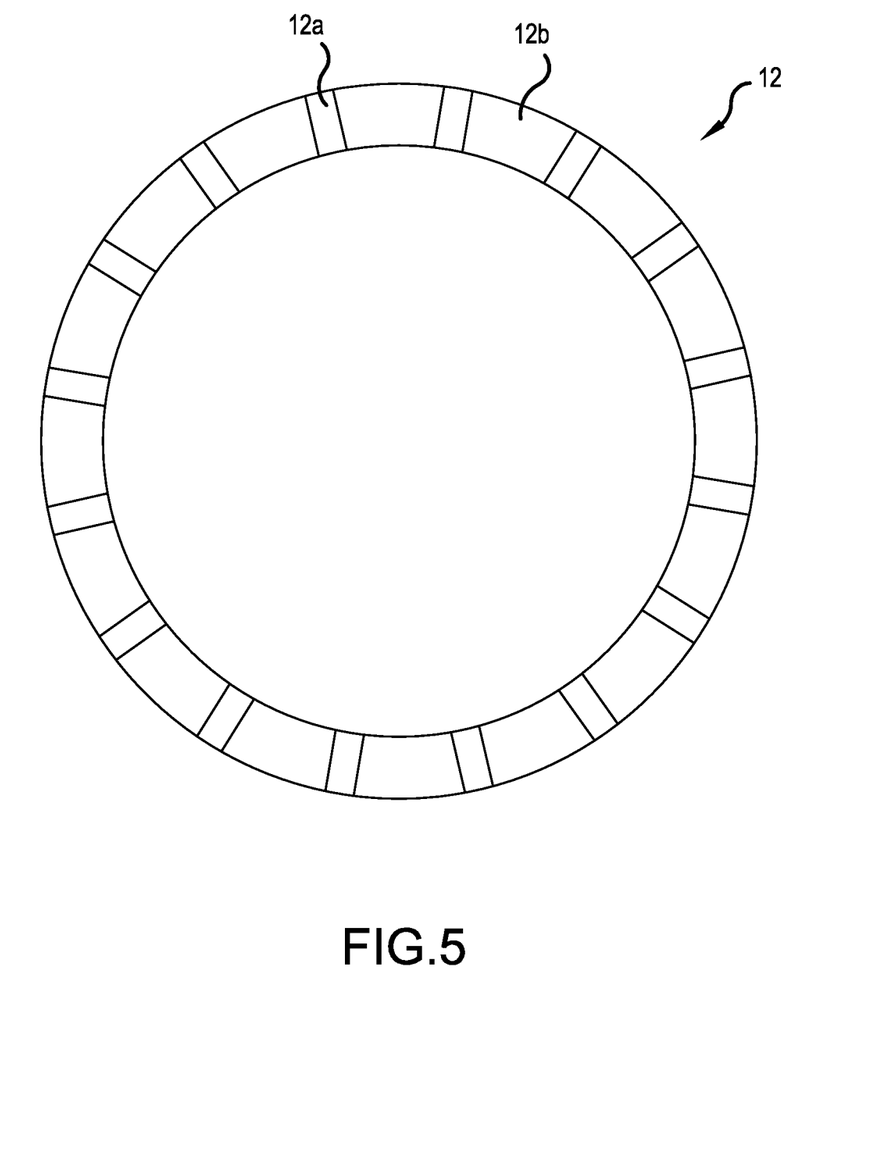
FIG. 5 is a front elevational view of the first sensor target member of FIG. 1.

Further, each one of the first and second target members 12, 16 is preferably formed as either a ferromagnetic target or a magnetic target. In the disclosed embodiment, the first target member 12 is formed as a magnetic target and comprises a plurality of magnets 12a (FIG. 5) disposed in a circumferentially spaced apart manner in a body 12b of non-magnetic material such as rubber or plastic. The magnets 12a are preferably fabricated from a hard magnetic material such as ferrite, samarium iron nitrogen, samarium cobalt or neodymium, and the body 12b is preferably formed from a plastic (such as PA66, PA46, PPS, or PPA) or rubber (such as nitrile butadiene rubber (NBR), hydrogenated nitrile butadiene rubber (HNBR) or a fluoro-elastomer such as FKM). The second target member 16 is preferably a ferromagnetic target and includes an annular ring made of a ferromagnetic material (i.e., a metallic material with a relative magnetic permeability greater than 1 such as steel, certain grades of stainless steel, etc.). Such a ferromagnetic ring may be produced by stamping process, metal powder sintering, machining, etc. and is has a plurality of circumferentially spaced gaps 22 so as to generate a magnetic pattern when rotated in front of a permanent magnet included in the second sensor 18.

The second target member 16 is preferably attached to the protrusions 21 extending from the flange portion 7 of the inner member 3 by, for example, a plurality of fasteners. The second target member 16 and the second sensor 18 provide redundancy in the event that the first sensor 14 and/or the first target 12 fail or are damaged so that necessary wheel speed information is supplied to the controller 11 even in the event of such a failure.

It is possible to form both the first target member 12 and the second target member 16 as magnetic targets or as ferromagnetic targets. However, it is preferred that the first target member 12 and the second target member 16 (and their associated first sensor 14 and second sensor 18) be formed differently, that is, one as a ferromagnetic target member and the other as a magnetic target member. In this manner substances and/or conditions that are more likely to interfere with the operation of one type of sensor/target member combination are less likely to interfere with both the first sensor 14 and the second sensor 18. For example, metal filings or shavings that could be present in a worn wheel hub assembly might accumulate on the magnetic elements of a magnetic target like the first target member 12 of the disclosed embodiment and make the first target member 12 difficult to read. Such contaminants are less likely to affect the operation of a ferromagnetic disk like the second target member 16 in the disclosed embodiment.

When the first target member 12 moves past the first sensor 14 and the second target member 16 moves past the second sensor 18, the magnets 12a or gaps 22 are detected by the first and second sensors 14, 18, respectively, and cause the first and second sensors 14, 18 to produce a series of electrical pulses. Preferably, each one of the first sensor 14 and the second sensor 18 includes a variable reluctance magnetic speed sensor, such as a Hall effect sensor, but may be any other appropriate type sensor capable of detecting rotation of the first and second target member 12, 16, for example, an optical sensor, a Giant Magnetoresistance (GMR) sensor, an Anisotropic Magnetoresistance (AMR) sensor, or a Tunnel Magneto Resistance (TMR) sensor.

A first output line 50 connects the first sensor 14 to the controller 11 and a second output line 52 connects the second sensor 18 to the controller 11. The controller 11 is configured to determine from the number of pulses produced by the first sensor 14 the angular rotation speed of the first target member 12 and thus of the inner member 2. Alternately, the first sensor 14 itself may include circuitry to determine the angular rotation speed of the first target 12, and the first sensor 14 may send an output signal indicative of the rotational speed to the controller 11 instead of sending raw pulse information. In either case, the controller 11 determines from the data received from the first sensor 14 and the second sensor 18 whether the angular rotational speed indicated by the first sensor 14 is the same as the angular rotational speed indicated by the second sensor 16, at least within a predetermined error range, and the controller 11 produces an output indicative of a mismatch in the indicated rotational speeds.

This output may be used to generate a warning signal that one or both of the first and second sensors of a give wheel hub assembly are faulty. In the alternative, the controller 11 may compare the rotational speeds indicated by each sensor of a given wheel hub assembly to the rotational speeds of the remaining wheels on the vehicle (e.g., four total wheels in the case of an automobile) (not illustrated). If, for example the first sensor 14 of the wheel hub assembly 1 of the first vehicle wheel indicates a rotational speed of 100 RPM and the second sensor 16 of the wheel hub assembly 1 of the first vehicle wheel indicates a rotational speed of 200 RPM and the first and second sensors of the three remaining wheels all indicate wheel rotational speeds of approximately 200 RPM, the controller 11 will disregard the 100 RPM speed signal from the first sensor 14 and use only the signal from the second sensor 18 of the first vehicle wheel hub assembly 1. The system functions in a similar manner when no signal or a continuous signal is received from a particular sensor. If only one sensor were present on the given vehicle wheel, an ABS or traction control system might attempt to brake one or more wheels to equalize the speeds of the wheels.

Figure 3:
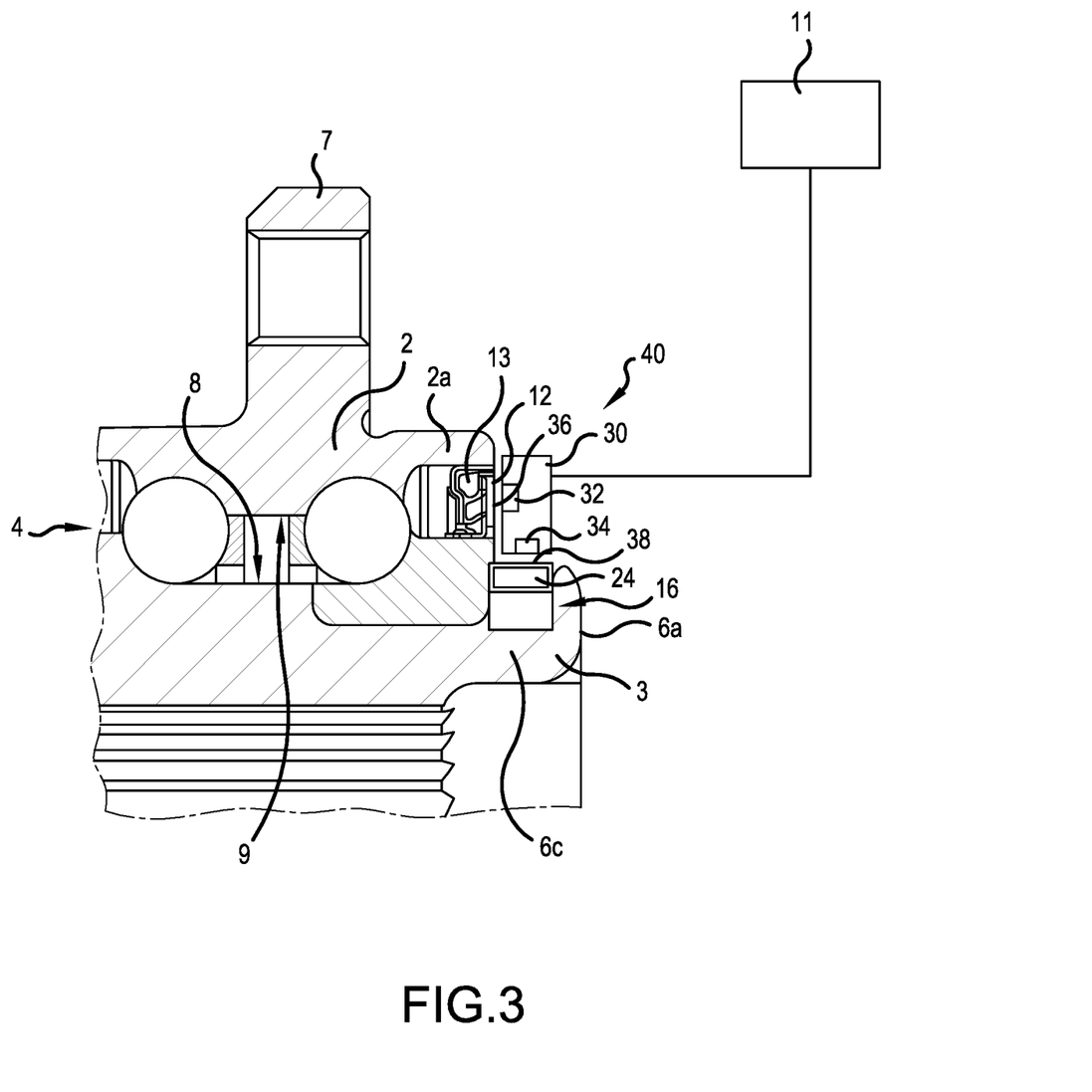
FIG. 3 is an axial cross-sectional view of a wheel hub assembly showing an alternative sensor assembly that includes first and second sensors and first and second targets.
Figure 4:
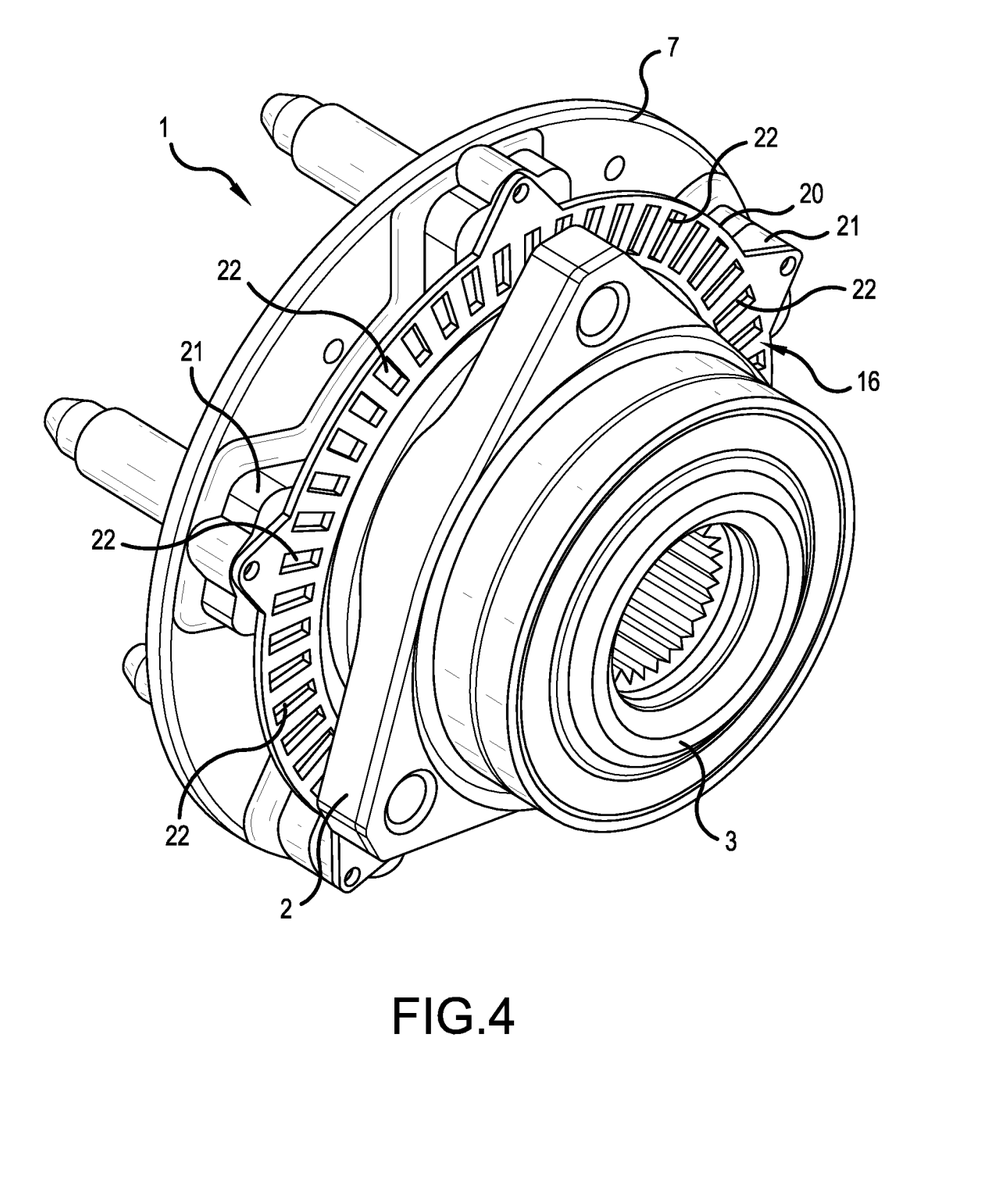
FIG. 4 is a perspective view of a wheel hub assembly showing the location of the second target member of FIG. 2.

An alternate embodiment of the disclosure is illustrated in FIG. 3. In this embodiment, a sensor assembly 40 includes the first target member 12 of the previous embodiment located, for example, on a portion of the bearing seal assembly 13. The first target member 12 has an axially facing target surface 36; that is, the magnets 12a of the first target 12 are configured to function with a first sensor 32 mounted axially adjacent to the first target member 12. The second target member 24 is axially spaced from the first target member 12 and comprises either a plurality of magnets or a ferromagnetic member having slots and/or teeth the movement of which can be sensed by a second sensor 34. The second target member 24 is configured to have a radially facing target surface 38, that is, is configured to be sensed by a second sensor 34 that is radially spaced from the second target member 24. With this arrangement, while the first target member 12 and the second target member 24 are axially spaced, they are located such that the first sensor 32 and the second sensor 34 can be mounted in unitary body of material 30 as a dual sensor unit. This may reduce the number of parts in the sensor assembly 40 while still providing the redundancy of the sensor assembly 10 of the first embodiment.

The present invention has been described herein in terms of presently preferred embodiments. However, modifications and additions to these embodiments will become apparent to persons of ordinary skill in the art upon a reading of the foregoing description. It is intended that all such modifications and additions form a part of the present invention to the extent they fall within the scope of the several claims appended hereto.

We claim:
1. A vehicle wheel hub assembly comprising:
an outer member configured to be mounted to a non-rotatable portion of the vehicle, the outer member having an axial inner end and an axial outer end;
an inner member rotatably supported in the outer member by a bearing, the inner member being configured to support a vehicle wheel for rotation about a central axis of the bearing, the inner member comprising a shaft portion having an axially inner end and an axially outer end and a flange extending radially outwardly from the axially outer end of the shaft portion,
a first target member coupled with the inner member so as to be rotatable about the central axis; a first sensor fixed to the outer member and positioned to sense an angular displacement of the first target member relative to the outer member and to produce a first output signal;
a second target member coupled with the inner member so as to be rotatable about the central axis, the second target member being spaced axially from the first target member;
a second sensor fixed to the outer member and positioned to sense an angular displacement of the second target member relative to the outer member and to produce a second output signal,
wherein the first target member is located at the inner axial end of the inner member and the second target member is located at the outer axial end of the inner member.

2. The vehicle wheel hub assembly of claim 1, wherein the first target member is located radially inward of the outer member and the second target is located radially outward of the outer member.

3. The vehicle wheel hub assembly of claim 2, wherein the first target member or the second target member or both the first target member and the second target member comprises a ferromagnetic ring or a magnetic ring.

4. The vehicle wheel hub assembly of claim 3 wherein the second target member is mounted on the flange portion of the inner member.

5. The vehicle wheel hub assembly of claim 2,
wherein the flange includes a plurality of axially inwardly extending protrusions, and
wherein the second target member comprises an annular ferromagnetic disk having a plurality of circumferentially spaced-apart openings, the annular disk being mounted to the plurality of protrusions such that portions of the annular ferromagnetic disk are axially spaced from the flange.

6. The vehicle wheel hub assembly of claim 1, wherein the second target member includes a substantially annular plate formed of ferromagnetic material and having a plurality of circumferentially spaced-apart openings extending axially through the plate.

7. The vehicle wheel hub assembly of claim 1, wherein the first target member comprises an annular body formed of magnetized rubber.

8. The vehicle wheel hub assembly of claim 1, wherein each one of the first and second sensors is selected from the group consisting of a magnetic speed sensor, a Hall effect sensor and an optical sensor.

9. The vehicle wheel hub assembly of claim 1,
wherein the first target member comprises ring of circumferentially spaced magnets and the second target member comprises a ferromagnetic plate having a plurality of circumferentially spaced openings extending axially through the plate.

10. An antilock braking system comprising:
the vehicle wheel hub assembly of claim 1;
a controller in communication with the first sensor and the second sensor and configured to receive the first output signal and the second output signal and to control a brake member for braking the inner member relative to the outer member based on the first output signal and/or the second output signal;
wherein the controller is configured to generate a first speed signal indicative of a wheel rotation speed from the first output signal and to generate a second speed signal indicative of the wheel rotation speed from the second output signal and to generate an error signal when the first speed signal differs from the second speed signal by more than a predetermined amount.

11. The vehicle wheel hub assembly of claim 1,
wherein the outer member includes a radially inner surface and a radially outer surface,
wherein the first target member extends radially inward from the radially inner surface, and
wherein the second target extends radially outward from the radially outer surface.

12. The vehicle wheel hub assembly of claim 1 wherein at least one of the first and second target members includes a ferromagnetic ring or a magnetic ring.

13. The vehicle wheel hub assembly of claim 1 wherein the second target member is connected with the flange portion of the inner member.

14. The vehicle wheel hub assembly of claim 1,
wherein the flange includes a plurality of axially inwardly extending protrusions, and
wherein the second target member comprises an annular disk having a plurality of circumferentially spaced-apart openings, the annular disk being mounted to the plurality of protrusions such that portions of the annular disk are axially spaced from the flange.

15. A vehicle wheel hub assembly comprising:
an outer member configured to be mounted to a non-rotatable portion of the vehicle, the outer member having an axial inner end and an axial outer end;
an inner member rotatably supported in the outer member by a bearing, the inner member being configured to support a vehicle wheel for rotation about a central axis of the bearing, the inner member comprising a shaft portion having an axially inner end and an axially outer end and a flange extending radially outwardly from the axially outer end of the shaft portion,
a first target member coupled with the inner member so as to be rotatable about the central axis; a first sensor fixed to the outer member and positioned to sense an angular displacement of the first target member relative to the outer member and to produce a first output signal;
a second target member coupled with the inner member so as to be rotatable about the central axis, the second target member being spaced axially from the first target member;
a second sensor fixed to the outer member and positioned to sense an angular displacement of the second target member relative to the outer member and to produce a second output signal; and
wherein the first target member includes an axially facing target surface and the first sensor is axially spaced from the target surface and the second target member comprises a radially facing target surface and the second sensor is radially spaced from the target surface of the second target member.

16. The vehicle wheel hub assembly of claim 15, wherein the first sensor and the second sensor are mounted in a unitary sensor housing.

17. An antilock braking system comprising:
the vehicle wheel hub assembly of claim 15;
a controller in communication with the first sensor and the second sensor and configured to receive the first output signal and the second output signal and to control a brake member for braking the inner member relative to the outer member based on the first output signal and/or the second output signal;
wherein the controller is configured to generate a first speed signal indicative of a wheel rotation speed from the first output signal and to generate a second speed signal indicative of the wheel rotation speed from the second output signal and to generate an error signal when the first speed signal differs from the second speed signal by more than a predetermined amount.

18. A method comprising:
using a first sensor rotationally fixed relative to a vehicle to obtain a first angular displacement signal from a first target mounted for rotation with a wheel of the vehicle;
using a second sensor rotationally fixed relative to the vehicle to obtain a second angular displacement signal from a second target mounted for rotation with the wheel, the second target being axially spaced from first target;
obtaining a first speed signal indicative of a speed of the wheel from the first angular displacement signal;
obtaining a second speed signal indicative of the speed of the wheel from the second angular displacement signal; and
generating an error signal if the first speed signal differs from the second speed signal by more than a predetermined amount.

19. The method according to claim 18,
wherein obtaining a first angular displacement signal comprises detecting a movement of a plurality of spaced magnets past the first sensor and obtaining the second angular displacement signal comprises a the movement of a plurality of circumferentially spaced slots in a ferromagnetic disk past the second sensor.

* * * * *